United States Patent

Chapski

(10) Patent No.: US 8,494,749 B2
(45) Date of Patent: Jul. 23, 2013

(54) METHOD OF OPERATING AN ELECTRONIC ENGINE CONTROL (EEC) TO COMPENSATE FOR SPEED CHANGES

(75) Inventor: David L. Chapski, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 330 days.

(21) Appl. No.: 12/904,558

(22) Filed: Oct. 14, 2010

(65) Prior Publication Data

US 2012/0090330 A1    Apr. 19, 2012

(51) Int. Cl.
   *F02M 37/00*    (2006.01)
(52) U.S. Cl.
   USPC ............................................. 701/100; 60/793
(58) Field of Classification Search
   USPC .................. 701/100–104, 110; 123/434, 436, 123/675, 682, 468; 60/39.281, 39.01, 793
   See application file for complete search history.

(56) References Cited

U.S. PATENT DOCUMENTS

| | | | |
|---|---|---|---|
| 3,492,814 A * | 2/1970 | Urban | 60/39.281 |
| 3,606,754 A * | 9/1971 | White | 60/39.281 |
| 4,622,808 A | 11/1986 | Kenison et al. | |
| 4,866,980 A | 9/1989 | Falkmann et al. | |
| 5,023,793 A | 6/1991 | Schneider et al. | |
| 5,029,441 A | 7/1991 | Parsons | |
| 5,083,277 A * | 1/1992 | Shutler | 701/100 |
| 5,303,142 A | 4/1994 | Parsons et al. | |
| 5,474,052 A | 12/1995 | Aquino et al. | |
| 5,515,833 A | 5/1996 | Cullen et al. | |
| 5,526,794 A | 6/1996 | Messih et al. | |
| 5,551,410 A | 9/1996 | Messih et al. | |
| 5,666,918 A | 9/1997 | Pallett et al. | |
| 7,431,015 B2 * | 10/2008 | Mahoney et al. | 123/434 |
| 2007/0175449 A1 | 8/2007 | Mahoney et al. | |

FOREIGN PATENT DOCUMENTS

| | | |
|---|---|---|
| EP | 0324633 A2 | 7/1989 |
| EP | 2184466 A2 | 5/2010 |
| WO | 03023208 A1 | 3/2003 |

OTHER PUBLICATIONS

Extended European Search Report for EP Application No. 11191234.1-1267, dated May 4, 2010, pp. 1-6.

* cited by examiner

*Primary Examiner* — Dalena Tran
(74) *Attorney, Agent, or Firm* — Cantor Colburn LLP

(57) ABSTRACT

A method of operating an electronic engine control to compensate for speed changes. The method includes receiving a fuel flow request, sensing actual engine rotor speed, calculating a fuel flow correction factor, establishing a final fuel flow request based on the fuel flow correction factor, and adjusting the actual set point of the MV to compensate for the actual engine rotor speed.

4 Claims, 1 Drawing Sheet

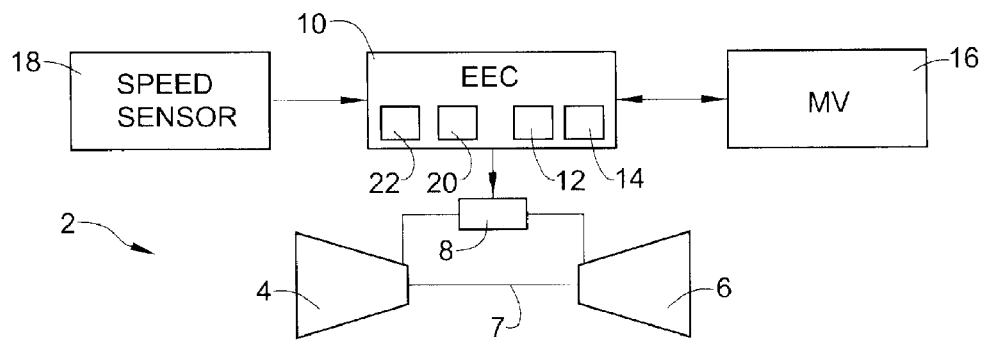
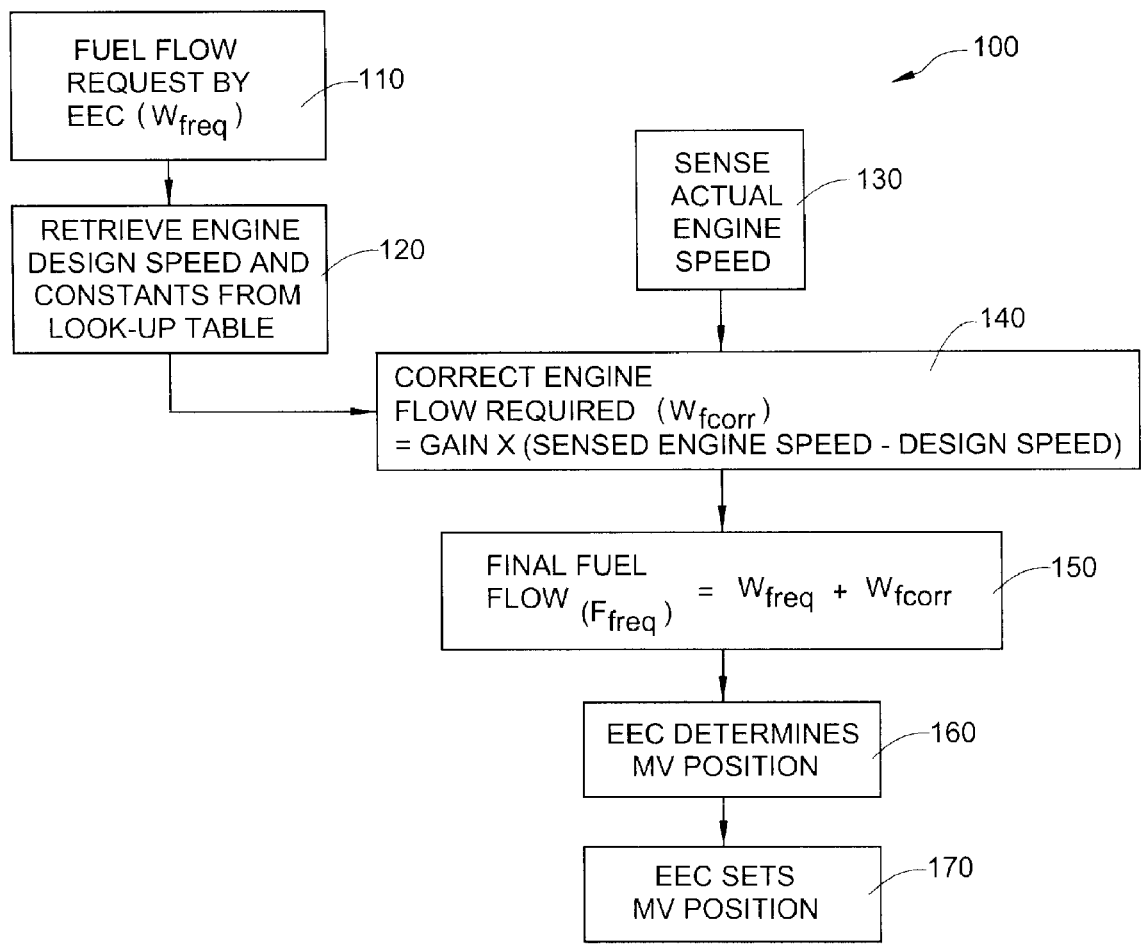

METHOD OF OPERATING AN ELECTRONIC ENGINE CONTROL (EEC) TO COMPENSATE FOR SPEED CHANGES

BACKGROUND OF THE INVENTION

Exemplary embodiments pertain to the art of electronic engine controls and, more particularly, to a method of operating an electronic engine control that controls fuel delivery to an engine to compensate for engine rotor speed changes.

Engines, particularly those used to power aircraft, rely on metered flow accuracy provided by a fuel control to provide proper performance. Variations resulting from fuel temperature changes, manufacturing tolerances, calibration/acceptance tests tolerances and the like are included in any accuracy analysis. In a typical fuel control algorithm, an electronic engine control (EEC) schedules fuel flow by establishing an opening of a metering valve (MV) having a flow window. The opening is based on signals from an electrical feedback device. A pressure regulating valve (PRV) is operatively coupled to the metering valve (MV) and is designed to establish a relatively constant pressure differential (delta P) across the flow window. The resulting flow from the metering valve is passed to the engine.

One factor that contributes to metered flow accuracy is maintaining the constant pressure differential (delta P) across the MV. The amount of flow over that which is required by the engine for a given operating condition, or bypass flow, passes across bypass flow windows of the PRV. The amount of bypass flow as well as the pressure drop across the bypass flow window has an impact on a delta P of the MV which then impacts the metered flow through the metering valve. Bypass flow is primarily driven by pump speed which is geared to a rotor of the engine, engine burn flow, pump volumetric displacement and fuel control/actuator (if applicable) internal leakages. The pressure drop across the PRV bypass flow window is primarily driven by engine compressor pressure, engine nozzle drops (which is a function of engine burn flow), and fuel control housing/valve pressure drops. For a specific engine fuel flow, the engine has a range of operating rotor speeds which varies with changing environment conditions such as altitude and engine load requirements such as bleed extraction. Metered flow accuracy is also a consideration when the EEC is operating in an open loop mode such as during start up or when the EEC has flow limits during engine acceleration/deceleration transients. These flow limits protect the engine against surge or flameout events yet also limit the ability for the engine to respond to rapid acceleration/deceleration requests.

BRIEF DESCRIPTION OF THE INVENTION

Disclosed is a method of operating an electronic engine control to compensate for rotor speed changes. The method includes receiving a fuel flow request, sensing actual engine rotor speed, determining a design set point of a metering valve (MV), calculating a fuel flow correction factor, establishing a final set point of the metering valve based on the fuel flow correction factor, and adjusting the actual set point of the MV to compensate for the actual engine rotor speed.

Also disclosed is an electronic engine control (EEC) including an engine rotor speed interface configured to receive a sensed engine rotor speed, a metering valve (MV) interface configured to control a MV that sets a fuel flow to an engine; and processing circuitry configured and disposed to adjust a set point of the MV based on sensed engine rotor speed.

BRIEF DESCRIPTION OF THE DRAWINGS

The following descriptions should not be considered limiting in any way. With reference to the accompanying drawings, like elements are numbered alike:

FIG. 1 is a schematic diagram of an electronic engine control (EEC) operatively connected to an engine in accordance with an exemplary embodiment; and FIG. 2 depicts a flow chart illustrating a method of adjusting a metering valve to compensate for engine rotor speed changes.

DETAILED DESCRIPTION OF THE INVENTION

A detailed description of one or more embodiments of the disclosed apparatus and method are presented herein by way of exemplification and not limitation with reference to the Figures.

Increasing performance of engines, particularly those employed in powered flight is of continued concern. One area of current interest is metered fuel flow during open loop conditions such as during engine starting, and during engine transients such as accelerations and decelerations. At present, metering valve (MV) accuracy is a result of a pressure differential (ΔP) of a pressure regulating valve (PRV), which varies over an entire range of the steady state and transient conditions for the engine. The MV flow relative to a position of the MV is based on the ΔP of the PRV seen during particular engine operating conditions. As such, MV position is often times less than optimal during flight and during start up. Changes in rotor speed which result from engine operating conditions such as at altitude will impact a pressure drop across the MV and thus have a negative effect on fuel flow accuracy and, by extension engine operating performance. Accordingly, exemplary embodiments provide a method and engine control that adjusts MV position to control fuel flow to an engine based on engine rotor speed changes as will be discussed more fully below.

With reference to FIG. 1, an engine, depicted as a gas turbine engine, is generally indicated at 2. Gas turbine engine 2 includes a compressor section 4 that is operatively connected to a turbine section 6 via a common compressor turbine shaft 7. The compressor section 4, turbine section 6, and shaft 7 may include multiple stages and components to support multiple spools, such as low pressure and high pressure spools. Compressor section 4 is also fluidly connected to turbine section 6 via a combustor 8. Combustor 8 delivers fuel to be mixed with air from compressor section 4 and is combusted to form combustion gases. The combustion gases are delivered to turbine section 6. Turbine section 6 converts thermal and kinetic energy from the combustion gases to mechanical rotation energy that is used for powered flight. An electronic engine control (EEC) 10 including processing circuitry 12 and memory 14 controls fuel delivery to combustor 8. EEC 10 is operatively connected to a metering valve (MV) 16 that controls fuel delivery to combustor 8, and a speed sensor 18 that detects a rotor speed of engine 2. More specifically, EEC 10 controls a set point of MV 16 to establish a desired fuel burn flow rate to combustor 8.

Processing circuitry 12 may include any combination of processing circuits known in the art, such as one or more microprocessors, microcontrollers, digital signal processors, and/or programmable logic devices. The memory 14 can store executable instructions and data to implement control laws of the EEC 10. EEC 10 also includes an engine rotor speed interface 20, and a metering valve interface 22. The engine rotor speed interface 20 converts data from the rotor speed sensor 18 into a format usable by the processing circuitry 12, for instance, a frequency-to-digital converter. It will be understood that the rotor speed sensor 18 need not directly provide engine rotor speed data but may indirectly provide engine speed data, such as an alternator/generator output frequency through a gearbox (not depicted) coupled to the gas turbine engine rotor 6. Metering valve interface 22 converts data from metering valve 16 into a format usable by processing circuitry 12 that provides an indication of metering valve position and also provides a pathway for EEC 10 to set a new valve opening for MV 16.

Reference will now be made to FIG. 2 in describing a method 100 of adjusting a set point of MV 16 to compensate for changes in rotor speed of engine 2. Following an engine rotor speed change, a fuel flow request ($W_{freq}$) is computed based on control logic stored in EEC 10 as indicated in block 110. At this point EEC 10 retrieves engine design speed and flow constant(s) (gain) from a look up table stored in memory 14 in block 120. The flow constant or gain is a slope of a fuel flow change curve for a given change in engine rotor speed. The flow constant or gain is, in accordance with one aspect of the exemplary embodiment based on a nominal fuel control. EEC 10 also receives a rotor speed signal from engine rotor speed sensor 18 as indicated in block 130. The speed signal represents the actual rotor speed of engine 2. EEC 10 then employs the engine design speed and flow constant to determine a fuel flow correction factor ($W_{fcorr}$) in block 140. The fuel flow correction factor is used to determine an actual or final fuel flow required ($F_{freq}$) for engine 2 as indicated in block 150. The fuel flow correction factor and final fuel flow required are, in accordance with one aspect of the exemplary embodiment, based upon the following equations. Of course, it should be understood that other equations could also be employed.

$$W_{fcorr} = \text{Gain} * (\text{sensed engine speed} - \text{design speed})$$

$$\text{Final Flow Required}(F_{freq}) = W_{freq} + W_{fcorr}$$

After establishing the final flow required, EEC 10 determines a position of MV 16 to meet the required fuel flow as indicated in block 160 and then sets the position of MV 16 as indicated in block 170.

At this point it should be understood that the exemplary embodiments provide a system that adjusts fuel delivery in an engine to compensate for rotor speed changes. Compensating for rotor speed changes enhances accuracy of fuel flow and expands an overall operational envelope of the engine. That is, the supplied fuel flow is tailored to an actual speed rather than being based on look up tables based on steady state conditions.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of operating an electronic engine control to compensate for rotor speed changes, the method comprising:
    detecting an engine rotor speed change;
    receiving a fuel flow request at the electronic engine control (EEC);
    sensing actual engine rotor speed;
    determining a design set point of the MV by retrieving a design flow constant stored in a look up table in a memory of the EEC;
    calculating a fuel flow correction factor for the design set point through the EEC;
    establishing a final fuel flow request based on the fuel flow correction factor; and
    adjusting an actual set point of a metering valve (MV) to compensate for the engine rotor speed change.

2. The method of claim 1, wherein sensing engine rotor speed includes sensing rotor speed of a gas turbine engine.

3. The method of claim 2, wherein sensing rotor speed of a gas turbine engine includes sensing rotor speed of a gas turbine engine during flight.

4. An electronic engine control (EEC) comprising:
    an engine speed interface configured to receive a sensed engine rotor speed;
    a metering valve (MV) interface configured to control a MV that sets a fuel flow to an engine; and
    processing circuitry configured and disposed to adjust a set point of the MV based on sensed engine rotor speed.

* * * * *